Figure 1:
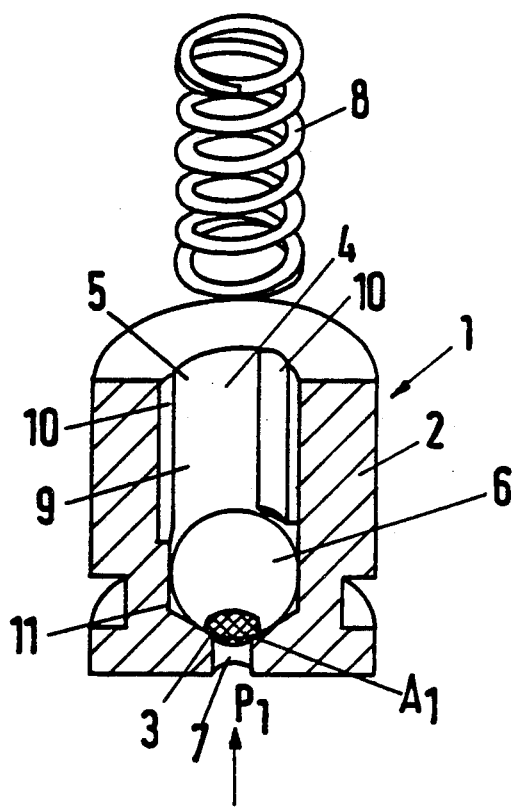

United States Patent [19]

Norskov et al.

[11] Patent Number: 5,002,230
[45] Date of Patent: Mar. 26, 1991

[54] VALVE FOR AN ATOMIZING NOZZLE AND THE LIKE

[75] Inventors: Preben Norskov; Leif B. Bonnerup, both of Nordborg; Ingvard M. Madsen, Sonderborg, all of Denmark

[73] Assignee: Danfoss A/S, Nordborg, Denmark

[21] Appl. No.: 463,436

[22] Filed: Jan. 11, 1990

[30] Foreign Application Priority Data

Jan. 14, 1989 [DE] Fed. Rep. of Germany ....... 3901032

[51] Int. Cl.[5] .............................................. B05B 1/30
[52] U.S. Cl. ............................. 239/533.15; 137/513.5; 239/462; 239/570
[58] Field of Search ............... 239/533.1, 533.15, 570, 239/571, 462, 493, 575, 533.2; 137/513.5

[56] References Cited

U.S. PATENT DOCUMENTS

| | | | |
|---|---|---|---|
| 1,515,664 | 11/1924 | Dunkelberger | 239/533.15 |
| 1,982,228 | 11/1934 | Murphy | 239/493 |
| 2,098,487 | 11/1937 | Cooper et al. | 239/570 |
| 2,621,077 | 12/1952 | Pieroni | 239/570 |
| 2,643,915 | 6/1953 | Pieroni | 239/571 |
| 3,746,038 | 7/1973 | Simmons | 137/513.5 |
| 4,231,520 | 11/1980 | Waldrum | 239/571 |
| 4,736,893 | 4/1988 | Norskov | 239/462 |
| 4,763,843 | 8/1988 | Bombis et al. | 239/571 |

FOREIGN PATENT DOCUMENTS 3308153 9/1984 Fed. Rep. of Germany ................. 239/533.15

Primary Examiner—Andres Kashnikow
Assistant Examiner—Michael J. Forman
Attorney, Agent, or Firm—Wayne B. Easton; Clayton R. Johnson

[57] ABSTRACT

Disclosed is a valve that is particularly useful in a pressure atomizing nozzle of a heating installation and includes a valve housing in which there is a valve seat with an adjoining valve chamber and a flow passage that opens to a housing outlet. In the valve chamber there is provided a spring for resiliently urging the closure member to seat on the valve seat. The valve chamber has a guide section adjacent the valve seat that is of a transverse cross section corresponding to a transverse cross section of the closure member while the housing and closure member provide a free flow passage to the outlet when the closure member is moved axially away from the valve seat at least a preselected axial distance. The valve is of a construction that ensures that fluid can flow through the valve only after a particular desire pressure has been reached, but immediately after the conveying pressure drops below a predetermined value, fluid can no longer reach the housing outlet.

9 Claims, 2 Drawing Sheets

VALVE FOR AN ATOMIZING NOZZLE AND THE LIKE

The present invention relates to a valve having a housing with a valve seat and an adjoining valve chamber with a flow passage leading to the outlet, and a closure member in the valve chamber that opens in the direction of flow and is axially moveable against the force of a spring. The valve in particular may be built into a pressure atomizer nozzle of a heating installation.

Such a valve is, for example, known from DE-OS No. 3308153. In the stop valve disclosed therein, the flow passage starts in the circumferential wall of the valve chamber at the level of the valve seat. The stop valve which is built into the pressure atomising nozzle of an oil-operated heating installation comprises a closure member adjustable to two terminal positions and a diaphragm-like toggle spring which acts thereon and holds the stop valve in the rest position. It is only when the inlet pressure exceeds a predetermined pressure such as that necessary for atomising, that the toggle spring jumps over and opens the stop valve. If the inlet pressure drops, the stop valve closes automatically. In the open position, the toggle spring is partly received by a recess in the nozzle cone so that it can assume a terminal position corresponding to the open position of the stop valve. In order that leakage oil reaching the recess can drain off, the nozzle cone contains a central ventilating bore which leads to the nozzle orifice.

However, in this known valve there is the problem that, after the burner is turned off, oil can leave the nozzle without control. If the recess is sealed from the outside, the leakage oil remains there and the valve fails to operate satisfactorily.

It is the problem of the present invention to construct a valve of the aforementioned kind so that fluid can flow through the valve only after reaching a certain desired pressure but, immediately after turning off a pump arranged in the supply conduit for the valve, fluid can no longer leave the outlet of the valve chamber.

This problem is solved according to the invention in accordance with the characterising portion of claim 1.

In the valve constructed in accordance with the invention, a distinction must be made between three conditions of the closure member in the valve chamber:

(a) In the closed position, the valve seat located at the end of the inlet passage is fully closed by the spring-loaded closure member. The cross-section of the valve seat is very much smaller than the cross-section of the valve member. For this reason, a high inlet pressure $P_1$ is necessary to move the closure member off the seat. Opening takes place when the following formula applies:

$$f \cdot x_1 < A_1 \cdot P_1$$

wherein
 $f$ = spring constant
 $x_1$ = spring displacement to the closed position
 $P_1$ = inlet pressure
 $A_1$ = area of closure member impinged by inlet pressure in the closed position (b) Intermediate positions of very short duration occur when the closure member moves off the valve seat. Fluid flows into the valve chamber and more particularly first into the guide section which adjoins the seat and the cross-section of which corresponds to the cross-section of the closure member. To permit movement of the closure member from the valve seat to the intermediate positions, it is necessary for the closure member to have a certain amount of play compared with the guide section, that is to say the cross-section of the closure member is slightly smaller than the cross-section of the guide section. For this reason, fluid also penetrates into the part of the valve chamber downstream of the guide section and builds up the outlet pressure $P_2$. The inlet pressure $P_1$ now acts on a larger area $A_2$ of the closure member. In addition, there is a counter-force acting on the closure member that depends on the throughflow quantity Q, so that the following formula is obtained:

$$f \cdot x << A_2(P_1 - P_2) - F$$

wherein
 $f$ = spring constant
 $x$ = spring displacement
 $P_1$ = inlet pressure
 $P_2$ = outlet pressure beyond the closure member
 $A_2$ = area of closure member impinged by the inlet pressure $P_1$ in the open position
 $F$ = counter-force produced by the flow $$F = Q \cdot c \cdot \sqrt{2 \cdot \rho \cdot P_1}$$

wherein
 $Q$ = flow volume
 $c$ = constant
 $\rho$ = specific weight of fluid (c) The closure member therefore moves on rapidly to its open position, namely up to the part of the valve chamber disposed downstream of the guide section and having a cross-section corresponding to that of the closure member. It reaches the region of the flow passage and frees same to produce a freeflowing section for the valve chamber. This considerably increases the counter-force produced by the flow and brings about an equilibrium, the differential pressure $(P_1 - P_2)$ having a markedly lower value than the opening pressure because the pressure-influenced area $A_2$ of the closure member in the open position is very much larger than in the closed position.

The following formula applies:

$$f \cdot x_2 = A_2 \cdot (P_1 P_2) - F_2$$

This formula characterises the open position of the closure member in the valve chamber.

The resulting force equilibrium in the valve chamber is upset as soon as the pump producing the conveying pressure is switched off. Since the static pressure as well as the dynamic pressure drop immediately thereafter, the force of the spring will move the closure member through the intermediate positions into the closed position. When the closure member has reached the guide section of the valve chamber, the counter-force F drops severely so that the valve closes rapidly. The valve therefore reacts promptly and reliably to the changed pressure conditions. With the valve according to the invention, it is impossible after switching off the conveying pump for fluid still to leave the outlet of the valve chamber or a downstream nozzle in an uncontrolled manner.

It has proved to be particularly desirable for the flow passage to be formed by one or more longitudinal grooves in the inner wall of the valve chamber and for these grooves to start at an axial spacing from the seat. These longitudinal grooves enlarge the free flow section of the valve chamber to increase the flow volume and thus the counter-force. On the other hand, the pressure-influenced area of the closure member has the largest possible value so that the pressure difference across the closure member in the open position is very low in comparison with the opening pressure.

If the direction of flow in the valve according to the invention is to be turned through 90°, it is advantageous to form the flow passage as a transverse bore in the housing and having its mouth at an axial spacing from the seat.

In a preferred embodiment, the circular cross-section of the valve chamber downstream of the guide section possesses an enlargement. A piston serving as a closure member has a first section having a diameter corresponding to the guide section and a second section having a diameter corresponding to the enlargement. At least part of the outside of the second section is offset radially inwardly to form the flow passage. Accordingly, this valve chamber has two different internal diameters, the guide section having a smaller internal diameter than the adjoining enlargement. At its end facing the seat, the piston has a first section of smaller external diameter corresponding to the guide section with a certain amount of play.

In particular, the outside of the piston may have a flat in the axial direction to form the flow passage. Such a piston can be easily produced by turning and grinding off.

If the valve according to the invention is employed in a pressure atomising nozzle of a heating installation, it is advisable for the valve housing to be inserted in the nozzle housing of the pressure atomising nozzle and to be fixed by way of a filter element retained with the aid of a beaded ring. In this arrangement, oil flows from the filter element direct to the valve and then direct to the atomising nozzle. With the aid of this valve, one ensures that the nozzle is fed with oil only when there is an adequate atomising pressure and that, after switching the conveying pump off, oil can no longer drip out of the atomising nozzle without control.

Figure 2:
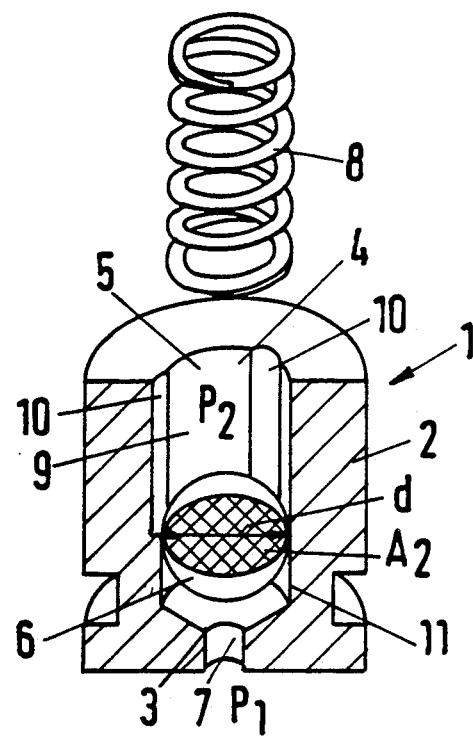
Figure 3:
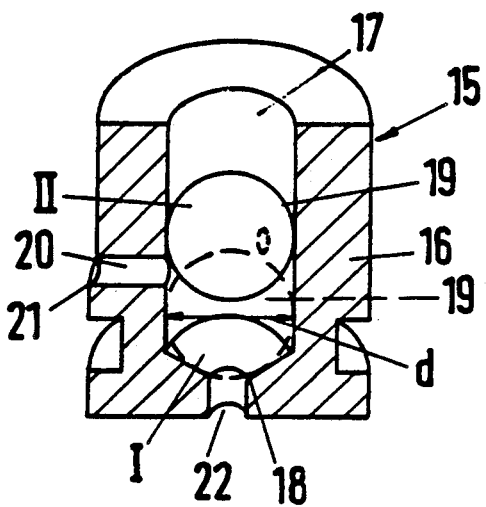
Figure 4:
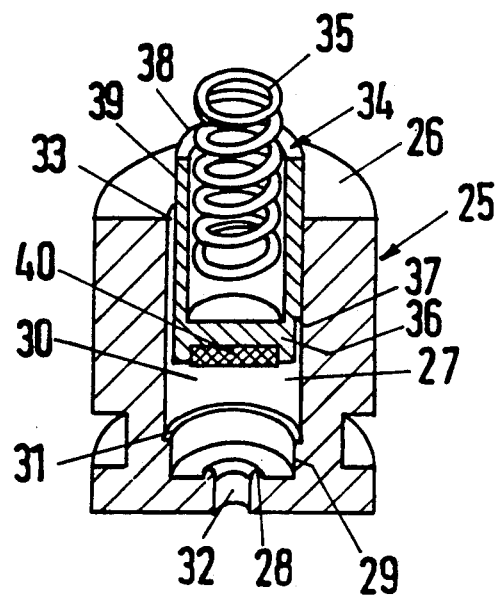
Figure 5:
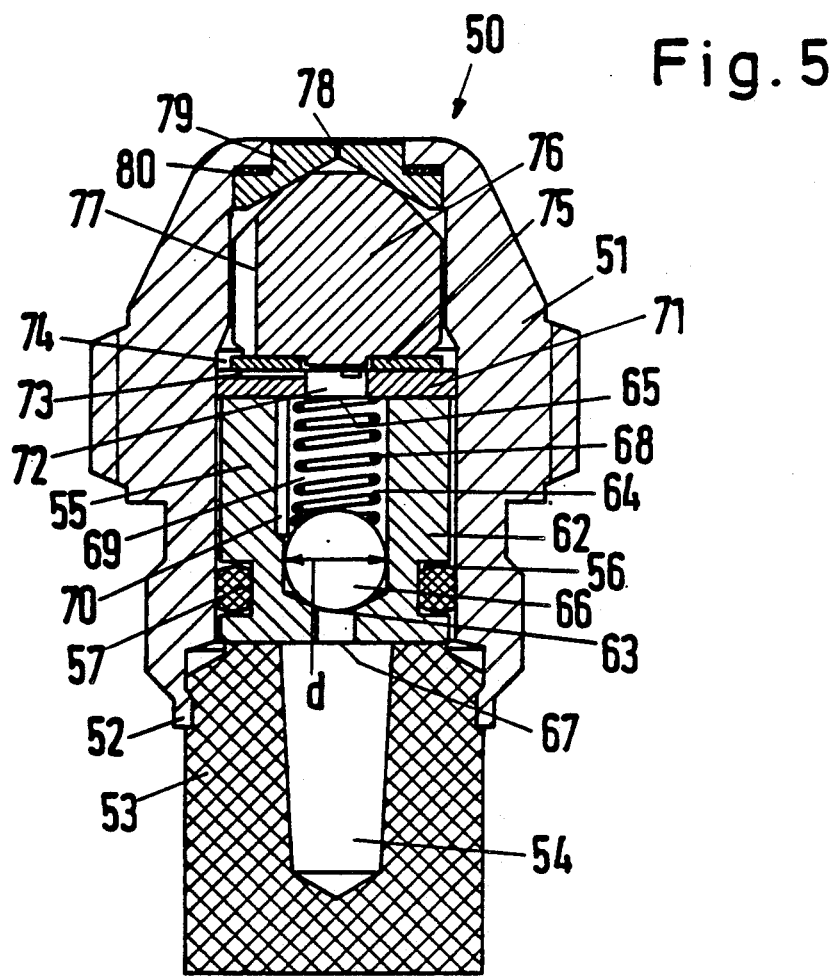

Preferred examples of the invention will now be described in conjunction with the drawing, wherein:

FIG. 1 is a section of one embodiment of the valve according to the invention in the closed position, FIG. 2 shows the FIG. 1 valve in the open position, FIG. 3 is a section of a further embodiment of a valve according to the invention, FIG. 4 is a section of another embodiment of a valve according to the invention, FIG. 5 shows a pressure atomising nozzle of a heating installation with the valve according to the invention.

The valve 1 shown in FIG. 1 comprises a housing 2 with a valve seat 3 and an adjoining valve chamber 4 with an outlet 5. In the closed position as shown in FIG. 1, the closure member in the form of a ball 6 closes the inlet 7. For reasons of clarity the spring 8 is shown outside the valve chamber 4. This spring 8 presses the ball 6 to the closed position against the valve seat 3. The inside 9 of the valve chamber 4 has longitudinal grooves 10 which partially enlarge the internal diameter of the valve chamber. In the guide section 11 of the valve chamber 4 adjoining the valve seat 3, its cross-section corresponds to the cross-section of the ball 6, i.e. the cross-section of the guide section 11 of the valve chamber 4 is slightly larger than the cross-section of the ball 6. In this way, the mobility of the ball 6 is ensured in this section. By way of example, the play is from 2/100 to 3/100 mm. Beyond this guide section 11, the longitudinal grooves 10 enlarge the free flow section of the valve chamber 4. The inlet pressure $P_1$ acts on the relatively small area $A_1$ of the ball 6.

In the open position shown in FIG. 2, the ball 6, has moved with its diameter d into the starting zone of the longitudinal grooves 10 of the valve chamber 4 against the force of the spring 8. The fluid pressure $P_1$ now acts on the larger area $A_2$. For this reason, the pressure difference $(P_1 - P_2)$ across the ball 6 is lower than the opening pressure.

During movement of the ball 6 from the closed position of FIG. 1 to the open position of FIG. 2, fluid flows around the ball 6 and reaches the section of the valve chamber 4 downstream of the ball 6. The longitudinal grooves 10 enlarge the free flow section of the valve chamber 4 and, by reason of the larger flow quantity, the counter-force in the valve chamber 4 rises, whereby the ball 6 is displaced into the starting zone of the longitudinal grooves 10.

This ensures that fluid will flow out of the valve chamber 4 only after a desired pressure. If the conveying pressure $P_1$ at the inlet 7 of the valve chamber 4 drops, so will the counter-force and, immediately after this pressure drop, the ball 6 moves to the closed position of FIG. 1. In this way, one ensures that, after lowering of the conveying pressure $P_1$, fluid can no longer leave the outlet 5 of the valve chamber 4.

Valve 15 shown in FIG. 3 comprises a housing 16 and in the housing 16 a valve chamber 17 with a valve seat 18. Against the force of a spring (not shown), a ball 19 serving as a closure member moves in the valve chamber 17 from the closed position I shown in broken lines to the open position II. It is only in the open position II that the transverse bore 20 in the housing 16 is freed. It opens or increases the free flow section of the valve 17 and thus forms the flow passage leading to the outlet 21. The latter is connected to the free end of the valve chamber 17.

A conveying pump (not shown in greater detail) conveys fluid to the inlet 22. Since the pressure-influenced area of the ball 19 is very small at the inlet, a high opening pressure is required. As soon as this has been reached, the ball 19 moves against the force of the spring (not shown) in the valve chamber 17 from the closed position I to the open position II. As long as the ball 19 is located with its diameter d below the transverse bore 20, that is to say in the guide section, a reduced amount of fluid flows in the guide section to the outlet 21 of the valve 15. However, as soon as the ball 19 with its diameter d is located above the transverse bore 20, the guide passage leading through the transverse bore 20 is freed so that the counter-force in the valve chamber rises.

Only now will fluid flow to the outlet 21 of the valve 15. If the conveying pressure at the inlet 22 of the valve 15 drops, the ball 19 will immediately move from its open position II to its closed position I. As soon as the ball 19 has reached below the transverse bore 20 with its diameter d, fluid will no longer flow out of the outlet 21 of the valve 15.

The valve 25 is shown in FIG. 4 as a housing 26 and a valve chamber 27 therein with a valve seat 28. Valve chamber 27 comprises a guide section 29 of smaller internal diameter and an enlargement 30 of larger internal diameter inter-connected by way of a step 31. The fluid flows to the outlet 33 by way of the inlet 32 of the valve chamber 27.

In the valve chamber 27, there is a piston 34 which is for the most part in the form of a hollow cylinder. In its interior, it has the spring 35 against the force of which the piston 34 moves to the open position. It comprises a first section 36 corresponding to the diameter of the guide section 29 and, connected thereto by way of a step 37, a second section 38 with an internal diameter corresponding to that of the enlargement 30. At a part of the outside 36 of the second section 38 the piston 34 has a flat 39 in the axial direction. A flow passage leading to the outlet 33 is thereby formed between the flat 39 and the wall of the enlargement 30. A sealing element 40 at the lower end of the piston 34 seals off the valve chamber 37 in the closed position.

In the closed position, the sealing element 40 of the piston 34 is seated on the seat 28. The piston 34 moves out of this position into the FIG. 4 open position through intermediate positions in which the first section 37 is still disposed in the guide section 29. Since the external diameter of the first piston section 36 is slightly smaller than the internal diameter of the guide section 29 of the valve chamber 27, very little fluid flows to the outlet 33 during these momentary intermediate positions. As soon as the end of the piston 34 has moved past the step 31, the flow passage between the inner wall of the enlargement 30 of the valve chamber 27 and the flat 39 of the piston 34 is freed, whereby the flow volume through the valve chamber 27 is increased. If the conveying pressure at the inlet 32 drops, the piston 34 moves back through the intermediate positions to its closed position.

The pressure atomising nozzle 50 of a heating installation as illustrated in FIG. 5 comprises a nozzle housing 51 having at its rear end a beaded ring 52 with the aid of which a filter 53 is fixed. In its interior, the filter 53, which may be of porous material, comprises a flow passage 54. Adjoining the filter 53 in the flow direction, there is the valve 55 in the form of an insert for the nozzle housing 51 and having at its outside an annular groove 56 with a sealing element 57. The valve 55 is a ball valve in the form of FIG. 1 or 2. The description of this valve can therefore be taken from the description of FIGS. 1 and 2.

The corresponding parts of valve 55 are identified with reference numerals increased by 60. On the outlet side, a filter disc 71 for the secondary filtration of the heating oil adjoins the valve 55. The filter disc 71 comprises a central supply passage 72, a plurality of radial filter passages 73 and an annular passage 74. The annular passage 74 is produced between the internal wall of the housing 51 and a spring plate 75 of which the external diameter is less than the internal diameter of the housing 51. Adjoining the spring plate 75, there is the nozzle cone 76 which comprises a twisted groove 77. The flow path for the heating oil leads from the annular passage 74 through the twisted groove 77 to the nozzle mouth 78 in the nozzle plate 79 which is sealed from the housing 51 by a seal 80. With regard to the accurate construction of the filter plate 71, attention is drawn to applicants' copending patent application entitled "Filter, particularly for the secondary filtration of heating oil".

An oil conveying pump (not shown) in the supply conduit for the pressure atomising nozzle 50 conveys oil through the filter 53 in the flow passage 54 to the valve 55. Since the pressure-influenced area of the ball 66 at the inlet 67 of the valve chamber 64 is small, a high opening pressure is necessary. When this opening pressure has been reached, the ball 66 moves from the closed position of FIG. 5 to an open position through intermediate positions in the guide-section of the valve chamber 64 of which the internal diameter corresponds to the external diameter of the ball.

In these intermediate positions, oil does not yet reach the section of the valve chamber 64 downstream of this section. It is only when the diameter of the ball 66 reaches the region of the longitudinal groove 70 at the inside 69 of the valve chamber 64 that the flow passage formed by the longitudinal groove 70 is freed and the heating oil flows through this flow passage to the outlet 65 of the valve chamber 64. The flow passage increases the flow volume of the heating oil, which results in a rise in the counter-force. If the conveying pump is switched off, the dynamic and static pressure in the valve chamber 64 drops and the ball 66 moves from its open position back to its closed position. As soon as the ball 66 has left the region of the longitudinal groove 70, heating oil no longer penetrates to the part of the valve chamber 64 disposed beyond the ball 66. In this way, it is impossible for non-pressurised leakage oil to reach the nozzle mouth 78 from the outlet 65 of the valve chamber 64 through the filter plate 71, the spring plate 75, the annular passage 74 and the twisted groove 77 and then to drip out of the nozzle mouth 78.

We claim:

1. Valve apparatus comprising a housing having a valve seat, an inlet opening to the valve seat, an outlet, and a valve chamber having a central axis of extension and being fluidly connected to the valve seat and the outlet, a closure member seatable against the valve seat to block fluid flow through the valve seat from the inlet to the valve chamber, and a spring for resiliently retaining the closure member in abutting relationship to the valve seat to block fluid flow from the inlet to the valve chamber, the valve chamber having a guide section opening to the valve seat and a second section opening to the guide section and being on the axial opposite the guide section from the valve seat, the guide section having a transverse cross section that corresponds to a closure member cross section to substantially block fluid flow axially therebetween when the closure member is spaced from the valve seat within a limited axial spacing and that at least one of the valve member and valve housing having means to provide passage of fluid to the outlet when the closure member is more than said limited axial spacing from the valve seat, said means comprising at least one of (1) the valve chamber having a reduced diameter section adjacent to the outlet and a housing groove that extends from the reduced section to the outlet, and (2) a closure member part that at least in part extends axially away from the guide section along said axis when the closure member is seated on the valve seat.

2. Valve apparatus according to claim 1, characterized in that said means comprises a longitudinal housing groove.

3. Valve apparatus according to claim 1, characterized in that said means comprises a flat that is defined by the closure member having a flat surface adjacent to the valve seat.

4. Valve apparatus comprising a housing having a valve seat, an inlet opening to the valve seat, an outlet, and a valve chamber having an axially extending central axis and being fluidly connected to the valve seat and to the outlet, a closure member seatable against the valve seat to block fluid flow through the valve seat from the inlet to the valve chamber, and a spring for resiliently retaining the closure member in abutting relationship to the valve seat to block fluid flow from the inlet to the valve chamber, the valve chamber having a guide section opening to the valve seat and a second section opening to the guide section axially remote from the valve seat, the guide section having a transverse cross section that corresponds to a closure member cross section to at least substantially block fluid flow axially therebetween when the closure member is spaced from the valve seat within a limited axial spacing from the seat, the guide section being of a smaller transverse cross section than the second section, the housing and closure member having cooperating means that permits fluid flow through the valve housing only after a preselected pressure at the inlet is reached and immediately after the fluid pressure at the inlet drops below a predetermined value, the closure member moves axially to block fluid flow through the valve chamber to the outlet, said means comprising at least one of a housing groove that extends from the guide section to the outlet and a closure member portion that extends at least axially away from the guide section when the closure member is seated on the valve seat.

5. Valve apparatus comprising a housing having a valve seat, an inlet opening to the valve seat, an outlet, and a valve chamber having a central axis and fluidly connected to the valve seat, a closure member seatable against the valve seat to block fluid flow through the valve seat from the inlet to the valve chamber and being movable along said axis, and a spring for resiliently retaining the closure member in abutting relationship to the valve seat to block fluid flow from the inlet to the valve chamber, the valve chamber having a guide section opening to the valve seat and being of an internal peripheral dimension that is only slightly larger than the corresponding transverse dimension of the closure member, the valve housing and the closure member having cooperating means defining a flow passage axially opposite the valve seat from the guide section to provide free flow of fluid from the valve seat to the outlet after the closure member moves axially away from the valve seat a preselected axial distance, and the outlet opening to the valve chamber downstream of the guide section, the cooperating means including at least one of housing (1) a longitudinal groove formed in and (2) a closure member fluid by pass part to extend axially from axially adjacent to the guide section to the outlet when the closure member is seated on the valve seat.

6. Valve apparatus according to claim 5 characterized in that the closure member has a transverse section of a maximum transverse peripheral dimension that is located along said axis inwardly of the passage and within the guide section when the closure member is seated on the valve seat.

7. Valve apparatus according to claim 5 in combination with a pressure atomizing nozzle having a nozzle housing that has an interior, the valve housing being mounted in the nozzle interior, the nozzle also having a filter element extending into the nozzle housing interior upstream of the valve housing and the nozzle housing having a beaded ring for retaining the filter in a fixed position relative to the nozzle housing.

8. Valve apparatus comprising a housing having a valve seat, an inlet opening to the valve seat, an outlet, and a valve chamber having a central axis and fluidly connected to the valve seat, a closure member seatable against the valve seat to block fluid flow through the valve seat from the inlet to the valve chamber and being movable along said axis, and a spring for resiliently retaining the closure member in abutting relationship to the valve seat to block fluid flow from the inlet to the valve chamber, the valve chamber having a guide section opening to the valve seat and being of an internal peripheral dimension that is only slightly larger than the corresponding transverse dimension of the closure member, the valve housing and the closure member having cooperating means defining a flow passage axially opposite the valve seat from the guide section to provide free flow of fluid from the valve seat to the outlet after the closure member moves axially away from the valve seat a preselected axial distance, and the outlet opening to the valve chamber downstream of the guide section, the valve chamber having an enlarged section downstream of the guide section of a larger transverse internal diameter than the corresponding internal diameter of the guide section and the closure member including a piston having a first section that in transverse cross section is of a diameter that corresponds to the internal diameter of the guide section and a second section that in transverse cross section is of a diameter that corresponds to the inner diameter of the valve chamber enlarged section, the cooperating means comprising the second section having at least a part radially outwardly offset from the first section to form the passage, the second section being more axially remote along said axis from the valve seat than the first section.

9. Valve apparatus section to claim 8 characterized in that the piston part comprises a flat.

* * * * *